US006912568B1

(12) United States Patent
Nishiki et al.

(10) Patent No.: US 6,912,568 B1
(45) Date of Patent: Jun. 28, 2005

(54) SERVICE MANAGEMENT SYSTEM

(75) Inventors: Kenya Nishiki, Fujisawa (JP); Masataka Ota, Machida (JP); Kenichi Yoshida, Kitamoto (JP)

(73) Assignee: Hitachi, Ltd., Tokyo (JP)

( * ) Notice: Subject to any disclaimer, the term of this patent is extended or adjusted under 35 U.S.C. 154(b) by 978 days.

(21) Appl. No.: 09/627,410

(22) Filed: Jul. 27, 2000

(30) Foreign Application Priority Data

Jul. 27, 1999 (JP) .......................................... 11-212174

(51) Int. Cl.[7] .......................................... G06F 15/173
(52) U.S. Cl. ...................... 709/223; 370/236; 370/252; 370/230
(58) Field of Search ................................ 709/223–227, 709/235, 102; 370/230, 232, 252, 236, 351, 254; 705/37; 707/104, 4, 10; 702/182

(56) References Cited

U.S. PATENT DOCUMENTS

| | | | | |
|---|---|---|---|---|
| 5,802,502 A | * | 9/1998 | Gell et al. | 705/37 |
| 5,898,668 A | * | 4/1999 | Shaffer | 370/230 |
| 6,026,411 A | * | 2/2000 | Delp | 707/104.1 |
| 6,032,189 A | * | 2/2000 | Jinzenji et al. | 709/235 |
| 6,202,037 B1 | * | 3/2001 | Hattori et al. | 702/182 |
| 6,205,465 B1 | * | 3/2001 | Schoening et al. | 709/102 |
| 6,404,738 B1 | * | 6/2002 | Reininger et al. | 370/236 |
| 6,549,938 B1 | * | 4/2003 | Kilkki et al. | 709/207 |
| 6,549,943 B1 | * | 4/2003 | Spring | 709/223 |
| 6,563,796 B1 | * | 5/2003 | Saito | 370/252 |
| 6,570,867 B1 | * | 5/2003 | Robinson et al. | 370/351 |

FOREIGN PATENT DOCUMENTS

| | | |
|---|---|---|
| JP | 09205427 | 8/1997 |
| JP | 09244973 | 9/1997 |
| JP | 9261254 | 10/1997 |

OTHER PUBLICATIONS

Effective bandwidth vectors for multiclass traffic multiplexed in partitioned buffer Kulkarmi et al ; IEEE Journal on , vol.: 13 Issue: 6 , Aug. 1995.*
Qu et al, A Framework for network Vulnerability Analysis; www.ece.arizona.edu/~hpdc/projects/nvat/NV-frame work. pdf.*
An Investigation of Indexing on the WWW—Srinivasan, Ruiz, Lam ;www.cs.uiowa.edu/~mruiz/papers/asis96.ps.*
RFC11157 Case, Fedor, Schoffstall, & Davin p. 1–36 May 1990.
RFC1213 SNMP Working Group p. 1–70, Mar. 1991.

* cited by examiner

*Primary Examiner*—Thong Vu
(74) *Attorney, Agent, or Firm*—Antonelli, Terry, Stout & Kraus, LLP

(57) ABSTRACT

Determining the degree of satisfaction of a user of network services quantitatively is difficult. A service quality management model defining means for defining the service condition and network depending relation and evaluation conditions, a means for storing the model in a DB, a service condition monitoring means for monitoring the transition of the service condition, and a service quality calculating and evaluating means for calculating service availability and executing special service maintaining and relieving measures are provided.

6 Claims, 20 Drawing Sheets

FIG.11

| | SERVICE QUALITY EVALUATION MODEL INPUT SCREEN | — □ X |
|---|---|---|
| CUSTOMER'S CONTRACT NUMBER | 1234567890 | |
| KIND OF SERVICES | VoIP | |
| SERVICE CLASS | Normal | |
| SPEECH DELAY(ms) | 400+ / 150-400 / 0-150 | |
| DEGRADING COEFFICIENT | 0.1 / 0.5 | |
| NUMBER OF USABLE CALLING CHANNELS (V: MINIMUM ASSURANCE VALUE) | 0.0-0.5*V / 0.5-0.95*V / 0.95*V+ | |
| DEGRADING COEFFICIENT | 0.01 / 0.2 | |
| SERVICE STARTING DATE AND TIME | 1999.01.10:09:00:00 | |
| SERVICE QUALITY EVALUATION INTERVALS | 02:00:00 | |
| | OK    Cancel | |

FIG.12

SERVICE GROUP QUALITY EVALUATION MODEL DEFINING SCREEN — 10551

- 10222 — CUSTOMER'S CONTRACT NUMBER: 1234567890
- 10232 — NAME OF SERVICE GROUP: CONNECTION OF AN ATM LEASED LINE — 10553

- 10552 — KIND OF SERVICES: EDI SERVICE    WEIGHTING COEFFICIENT: 0.5
- 10554 — SERVICE CLASS: BAND WIDTH ASSURANCE (0.3M)
- 10555 — USABLE BAND WIDTH(M): 0-0.1 | 0.1-0.2 | 0.2-0.3
  - 10233c, 10233b, 10233a
- 10556 — DEGRADING COEFFICIENT: 0.05 (10226b), 0.1 (10226a)

- 10557 — KIND OF SERVICES: TV MEETING SERVICE — 10558    WEIGHTING COEFFICIENT: 0.3
- 10559 — SERVICE CLASS: MINIMUM BAND WIDTH ASSURANCE (0.5M), MAXIMUM DELAY ASSURANCE
- 10560 — TRANSFER DELAY(ms): 600+ | 300-600 | 0-300
  - DEGRADING COEFFICIENT: 0.1, 0.8

- 10561 — KIND OF SERVICES: ELECTRONIC MAIL — 10562    WEIGHTING COEFFICIENT: 0.2
- 10563 — SERVICE CLASS: NO BAND WIDTH ASSURANCE, MAXIMUM ABANDONMENT RATE ASSURANCE
- 10564 — CELL ABANDONMENT RATE: $10^{-3}+$ | $10^{-6 \sim -3}$ | $10^{-6}$
- 10565 — DEGRADING COEFFICIENT: 0.2, 0.9

OK    Cancel

FIG.13

| | DEGREE OF SATISFACTION RESTORING MEASURES / NAME OF SERVICE | 10242a DEMAND FOR THE ISSUANCE OF TROUBLE TICKETS | 10242b PERFORMANCE REPORT TO A CUSTOMER | 10242c CUSTOMER'S DEMAND THAT THE SERVICE CHARGE BE COMPENSATED |
|---|---|---|---|---|
| | SERVICE AVAILABILITY EVALUATION POLICY INPUT SCREEN | | | |
| | CUSTOMER'S CONTRACT NUMBER: 1234567890 | | | |
| 10243 | SA1-int | 10243a LOWER THAN 0.95 | 10243b N/A | 10243c LOWER THAN 0.75 |
| 10244 | SA1-all | 10244a LOWER THAN 0.95 | 10244b LOWER THAN 0.9 | 10244c LOWER THAN 0.7 |
| 10245 | SA2-int | 10245a LOWER THAN 0.5 | 10245b N/A | 10245c N/A |

OK   Cancel

FIG.16

10331 SERVICE CONFIGURATION TABLE

| | |
|---|---|
| 10302 | CUSTOMER'S CONTRACT NUMBER |
| 10332 | NAME OF SERVICE |
| 10333 | THE KIND OF METHOD OF CALCULATIING SERVICE 1 (BY THE KIND OF SERVICE / BY THE GROUP) |
| 10334 | CONDITIONS FOR CALCULATING THE SERVICE (BY THE INTERVAL / SERVICE AVAILABILITY ACCUMULATED FROM THE TIME OF STARTING THE SUPPLYING OF SERVICES) |
| 10335 | NAME OF THE EVALUATION POLICY FOR THE SERVICE 1 |
| 10336 | NAME OF THE SERVICE 2 |
| 10337 | THE KIND OF CALCULATION OF THE SERVICE 2 |
| 10338 | CALCULATION CONDITIONS FOR THE SERVICE 2 |
| 10339 | NAME OF THE EVALUATION POLICY FOR THE SERVICE 2 |
| | ⋮ |
| 10340 | NAME OF THE SERVICE N |
| 10341 | THE KIND OF CALCULATING THE SERVICE N |
| 10342 | CALCULATION CONDITIONS FOR THE SERVICE N |
| 10343 | NAME OF THE EVALUATION POLICY FOR THE SERVICE N. |

FIG.17

10351 SA EVALUATION POLICY TABLE

| |
|---|
| 10352 — NAME OF EVALUATION POLICY |
| 10353 — DETERMINATION WHETHER THE DEGREE OF SATISFACTION RESTORING MEASURES 1 HAVE BEEN APPLIED |
| 10354 — THRESHOLD VALUE FOR EXECUTING THE DEGREE OF SATISFACTION RESTORING MEASURES 1 |
| 10355 — DETERMINATION WHETHER THE DEGREE OF SATISFACTION RESTORING MEASURES 2 HAVE BEEN APPLIED |
| 10356 — THRESHOLD VALUE FOR EXECUTING THE DEGREE OF SATISFACTION RESTORING MEASURES 2 |
| ⋮ |
| 10357 — DETERMINATION WHETHER THE DEGREE OF SATISFACTION RESTORING MEASURES N HAVE BEEN APPLIED |
| 10358 — THRESHOLD VALUE FOR EXECUTING THE DEGREE OF SATISFACTION RESTORING MEANSURES N. |

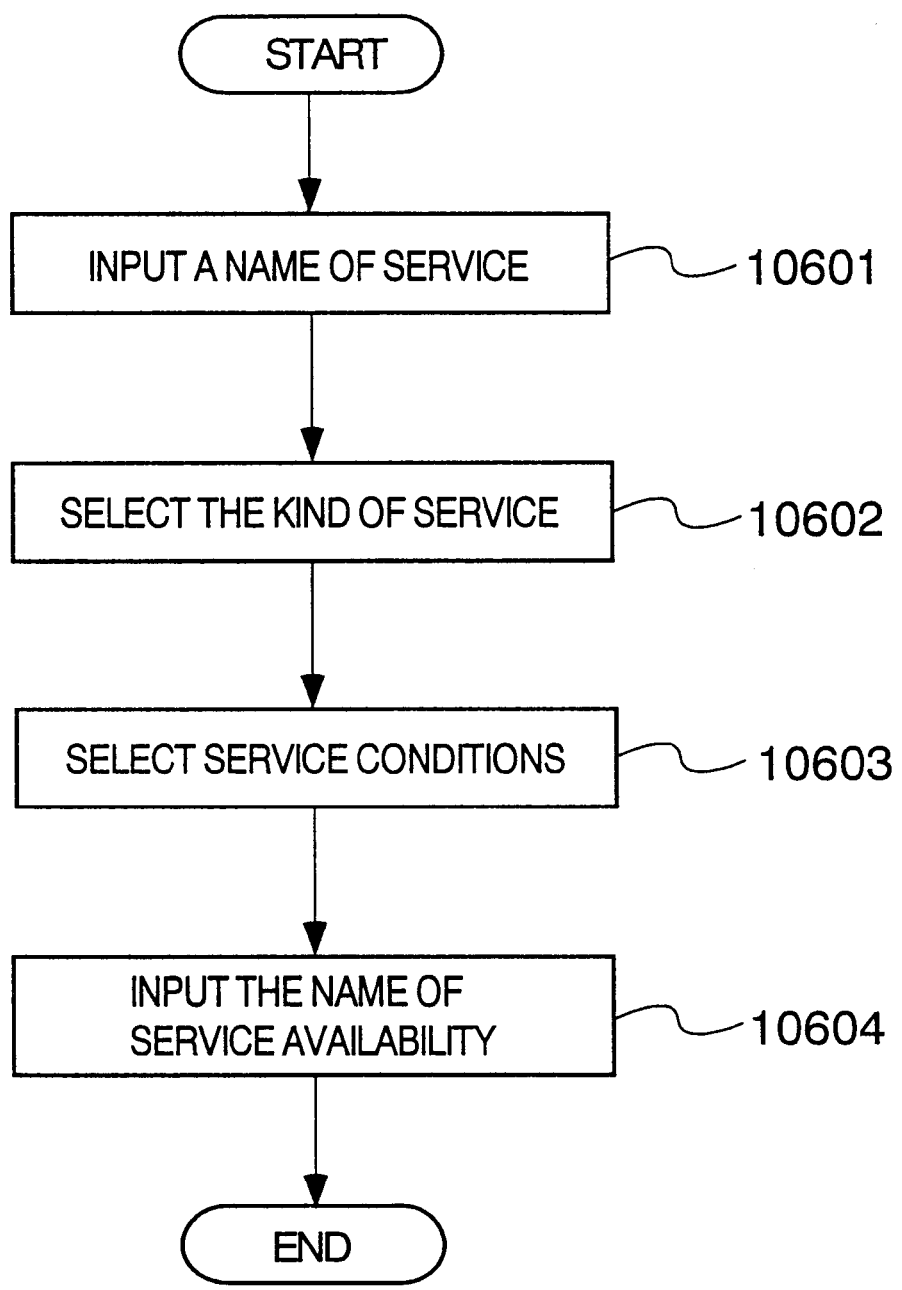

SERVICE MANAGEMENT SYSTEM

This application claims priority from Japanese Patent Application No. 11-212174 filed Jul. 27, 1999, the entire contents of which are incorporated herein by reference for all purposes.

BACKGROUND OF THE INVENTION

This invention relates to service management techniques for carrying out the measurement, calculation and evaluation of the quality of services on the basis of a service level agreement concluded between a communication service user and a communication service provider.

As the utilization of local area networks and electronic commerce have become popular in recent years, the data flowing on the networks have been put to practical use as they are in business. Under such circumstances, new problems have arisen in addition to a stoppage of and a delay in the operations of the networks which constitute the problems of the related art techniques of this kind. The new problems include a decrease in the quality of services supplied onto the networks, which causes the degree of a satisfaction in the network services of a user (which will hereinafter be referred to simply as "user") to decrease, and which possibly causes a working loss to occur. When the quality of the services decreases, a provider supplying network services (who will hereinafter be referred to simply as "provider") loses his customers, and suffers a decrease in the equipment efficiency in some cases. Therefore, it has become insufficient for a provider to merely carry out specialized management, which he has heretofore practiced, of the networks, infrastructures. Namely, it has become important to measure and evaluate the performance of the services supplied to a user, and maintain the quality of the services.

The techniques for meeting such requirements include a method of carrying out MIB (Management Information Base) type collection of traffic on network connection by utilizing SNMP (Simple Network Management Protocol) disclosed in "Service Quality Display for Computer Networks" of Japanese Patent Laid-Open No. 205427/1997, and expressing the condition of fluctuation of the traffic by color and thickness of lines on a network construction diagram. Also, a method is known of measuring various kinds of quality data (delay time, packet loss rate and average band width) concerning point-to-point network connection by utilizing a passive probe disclosed in "Method of and Apparatus for Measuring Service Quality" of Japanese Patent Laid-Open No. 261254/1997.

The details of SNMP and MIB are given in RFC (Request for Comment) 1157 and RFC 1213 respectively.

A user has become able to selectively utilize a variety of service qualities in addition to the existing best effort type internet services and private line services in which only fixed band width assurance is given. Consequently, the following modes of services have become important. Namely, it has become important that a provider measures service qualities on the basis of what have been agreed upon in advance by users and the provider concerning how to maintain the service qualities, and supplies services in conformity with the contents of the agreement.

The following techniques are disclosed in "User Relieving Method and System" of Japanese Patent Laid-Open No. 244973/1997 as techniques for dealing with the above-mentioned matter. Namely, in these techniques, the degree of satisfaction concerning a service level agreement, of users who are influenced by the occurrence of troubles, is expressed in terms of a satisfaction percentage by comparing the measurement data obtained by a network monitoring operation with the contents of a service level agreement. Limitations of the utilization of services are then placed on users of a high degree of satisfaction, i.e. users having a satisfaction percentage in excess of 100%, and users of a low degree of satisfaction concerning the service level agreement, i.e. users having a satisfaction percentage of lower than 100% are relieved. These techniques constitute a method of maintaining the service quality without spending money on the duplication of equipment.

SUMMARY OF THE INVENTION

The measurement data on evaluation items obtained by a network monitoring operation are merely collected as respectively independent measurement data. Therefore, it is difficult to determine the quality of supplied services as a whole.

When the contents of a service level agreement are not strictly observed, a great influence is exerted on a user's business in some cases, and not so great an influence in some cases. In a related art system of this kind, the degrees of users' satisfaction are calculated uniformly, and degrees of users' satisfaction with consideration given to the individual circumstances of the respective users were not obtained.

Since a provider could not know the degrees of users' satisfaction according to their individual circumstances, suitable steps could not be taken even when the degrees of users' satisfaction concerning the service level agreement are low.

It is therefore an object of the present invention to provide a service management system which has a single index representing the degrees of users' satisfaction determined with the individual circumstances of the users taken into consideration, and which is capable of obtaining the degrees of users' satisfaction being determined on the basis of this index.

It is another object of the present invention to provide a service management system which is capable of giving instructions for carrying out a suitable step according to the mentioned determined degree of users' satisfaction to some other existing system.

A first aspect of the invention which has been made so as to solve the above-mentioned first problems relates to a service management system provided with a server, plural user's terminals, and a service network formed of a network for connecting the server and plural user's terminals to each other, the server including service quality evaluation standard receiving means for receiving inputs of items for evaluating the quality of services supplied through the service network and evaluation standard for the information representative of the degree of the condition of services under the evaluation items; a service condition information obtaining means for obtaining information, which is representative of the degree of the service condition under the evaluation items, while services are supplied through the service network; and satisfaction degree-representing index calculating means for evaluating the obtained information, which represents the degree of the service condition, in accordance with the evaluation standard received by the service quality evaluation standard receiving means, and calculating a satisfaction degree-representing index indicating the degree of a user's satisfaction concerning the service quality.

A second aspect of the invention which has been made so as to solve the above-mentioned second problem relates to a service management system including in addition to the means as mentioned above to solve the first problems, satisfaction degree-representing index evaluation standard receiving means for receiving inputs of a range of satisfaction degree-representing indexes which the user can permit, and measures to be executed when the satisfaction degree-representing index is out of the range; means for comparing the calculated satisfaction degree-representing index and the permissible range of the satisfaction degree-representing index with each other; and means for giving instructions to execute the measures to be carried out practically which is received by the satisfaction degree-representing index evaluation standard receiving means, in a case where the results of the comparison made by the comparing means show that the satisfaction degree-representing index is out of the permissible range.

BRIEF DESCRIPTION OF THE DRAWINGS

Preferred embodiments of the present invention will be described in detail on the basis of the following figures, wherein:

FIG. 11 illustrates a service quality evaluation model inputting screen in the first embodiment of the present invention;

FIG. 12 illustrates a service group quality evaluation model inputting screen in the second embodiment of the present invention;

FIG. 13 illustrates a service availability evaluation policy inputting screen in the first embodiment of the present invention;

FIG. 16 illustrates a service configuration table according to the present invention;

FIG. 17 illustrates a service availability evaluation policy table according to the present invention;

FIG. 20 is a flow chart of a service configuration inputting operation according to the present invention.

DESCRIPTION OF THE PREFERRED EMBODIMENTS

The present invention will now be described on the basis of embodiments thereof in which the present invention is used for a system for managing the quality of network communication services, and with reference to the accompanying drawings.

Figure 3:
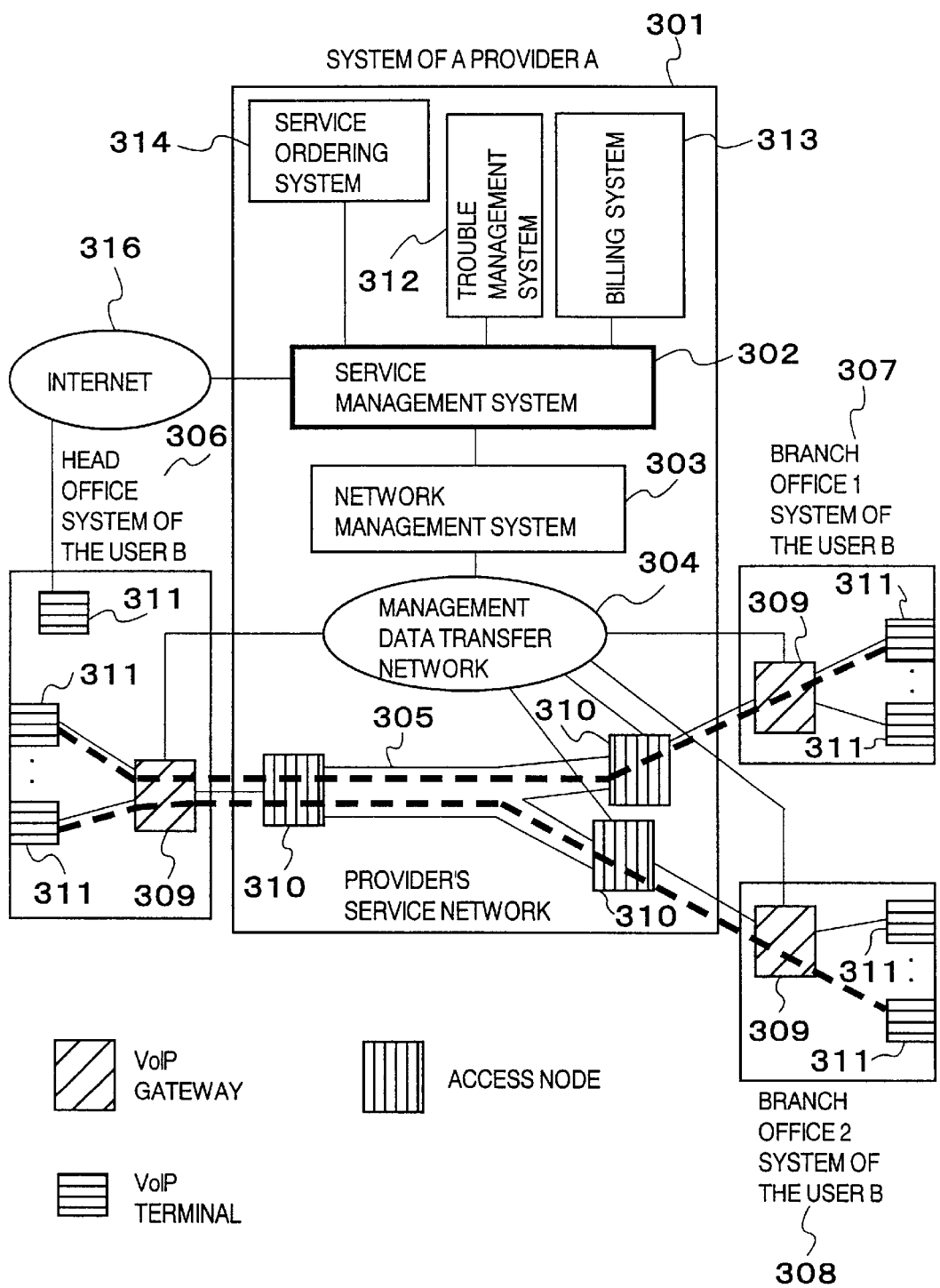
FIG. 3 illustrates the construction of a system of a service provider who supplies IP telephone services and that of a system of a user in a first embodiment of the present invention.

FIG. 3 is a construction diagram of the service management system in a first embodiment of the present invention. A provider A gives IP telephone services to a user B having plural positions.

A system 301 of the provider A includes a provider service network 305 adapted to supply IP telephone services; a management data transfer network 304 adapted to take and give management data from and to a network unit by using a protocol, such as SNMP: a network management system 303 adapted to monitor and control the network condition; a service management system 302 including a service quality management module 101 adapted to monitor the service condition in cooperation with the network management system 303; a trouble management system 312 adapted to carry out service trouble relieving and service restoring steps and deal with user's complaints; a billing system 313 adapted to impose service charge on the user, demand payment of service charge from the user and collect service charge; and a service order system 314 adapted to receive a user's request for the provider's presentation of services.

A system of the user B includes a head office system 306, a branch office 1 system 307 and a branch office 2 system 308. The head office system 306 and the two branch office systems 307, 308 are connected to access nodes 310, which are provided in the provider's service network, by using VoIP (Voice Over IP) gateways 309 provided on the side of the user. This enables the head office and branch offices of user B to talk over the telephone with each other by using VoIP terminals 311 network-connected to the VoIP gateways 309.

Figure 1:
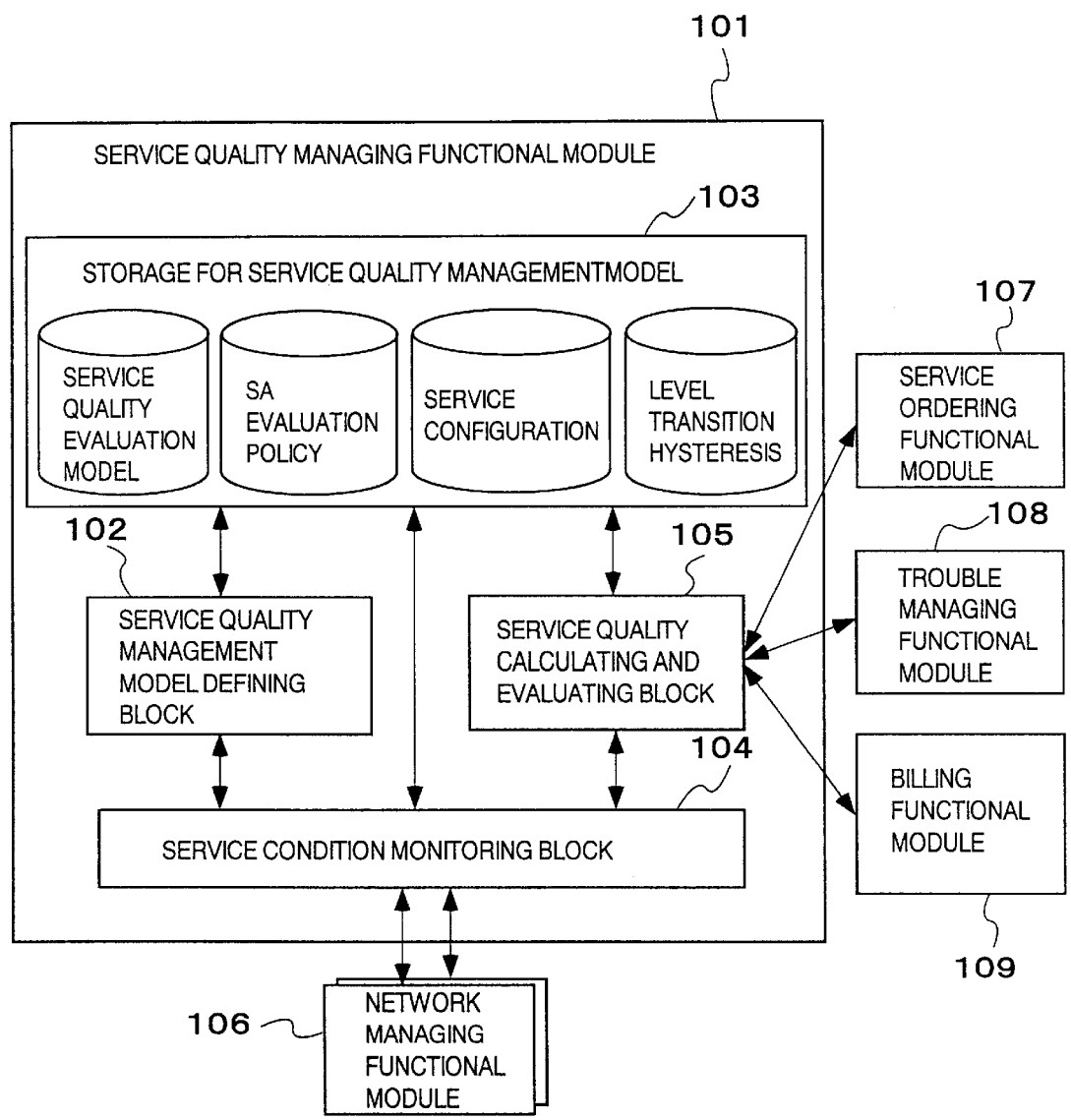
FIG. 1 illustrates functional blocks in embodiments of the system according to the present invention.
Figure 2:
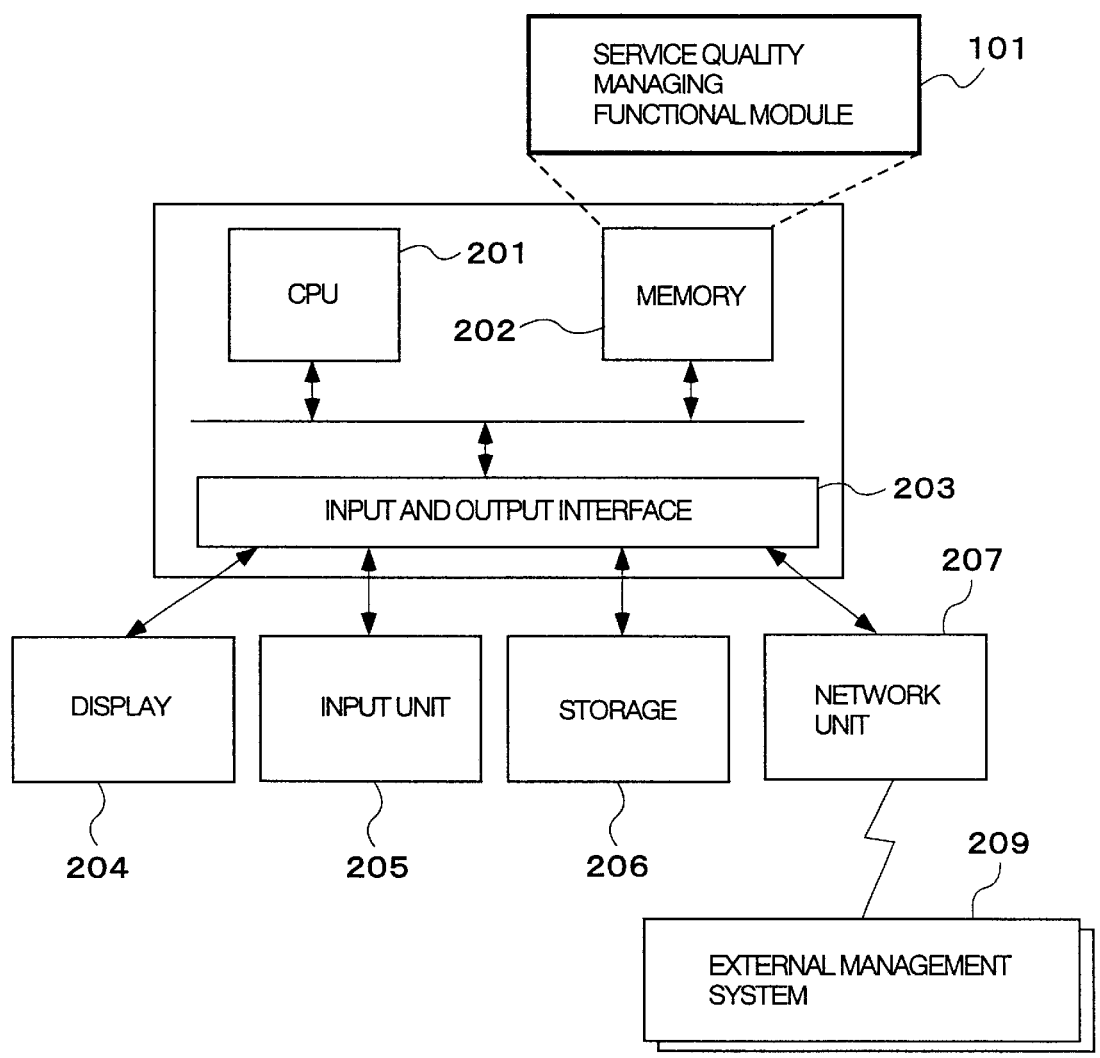
FIG. 2 illustrates the construction of hardware of the embodiments of the system according to the present invention.

FIG. 2 is a construction diagram of hardware which can be used for attaining this system. A service quality management module 101 shown in FIG. 1 can be formed on a computer provided with hardware including a CPU 201, a memory 202, an input-output interface 203, a display 204, an input unit 205, a storage 206 and a network unit 207. In this hardware, the service quality management module 101 is stored in the memory 202, and materialized as a process. The service quality management module 101 is connected to an external management system 209 (106–109 in FIG. 1) via the network unit 207.

The system 301 of the provider A is formed of such functional blocks as shown in FIG. 1. The system 301 includes the service quality management module 101 attaining the service management system 302 according to the present invention, a network management functional module 106, a service order functional module 107, a trouble management functional module 108, and a billing functional module 109 which are external modules. The network management functional module 106 is mounted on the network management system 303, the service order functional module 107 on the service order system 314, the trouble management functional module 108 on the trouble management system 312, and the billing module 109 on the billing system 313 respectively.

The service quality management module 101 is formed of a service quality management model defining block 102, a service quality management model storage block 103, a service quality calculation and evaluation block 104, and a service condition monitoring block 105.

The service quality management model defining block 102 provides an input screen for a service quality evaluation model, service configuration, and service availability evaluation policy (which will hereinafter be referred to as "SA evaluation policy"), and controls inputs and outputs into and from the screen.

The service quality evaluation model shows the standards on the basis of which a user evaluates the services supplied by a provider. A user inputs a signal into a service quality evaluation model input screen (which will hereinafter be referred to simply as "model input screen") 10221 shown in FIG. 11.

On the model input screen 10221 shown in FIG. 11, input fields for a customer's contract number 10222, a kind 10223 of services, a service class 10224, a speech delay 10225, a degrading coefficient 10226 thereof, a usable number 10227 of calling channels, a degrading coefficient 10228 thereof, service supply starting date and time 10229 and service quality intervals 10230 are displayed, and this model input screen receives an input from the user.

The customer's contract number 10222 represents a number for identifying a contract directly. The kind 10223 of services represents the kind of services provided. In this embodiment, VoIP is selected. Other kinds of services include EDI service and e-mail. The service class 10224 indicates a class of service, and, in this embodiment, "Normal" is selected. Other service classes include band width assurance. The speech delay 10225 and usable number 10227 of calling channels are service evaluation items. The service evaluation items include a disuse ratio of cells, which a user can select. The degrading coefficients 10226, 10228 are coefficients representing the degree of deterioration of a service level on the side of a user. A value of this degree of deterioration is determined by a user. The service supply starting date and time 10229 are service starting date and time desired by a user. The service quality evaluation intervals 10230 represent time intervals at which a service quality evaluation process which will be described later is carried out.

Figure 14:
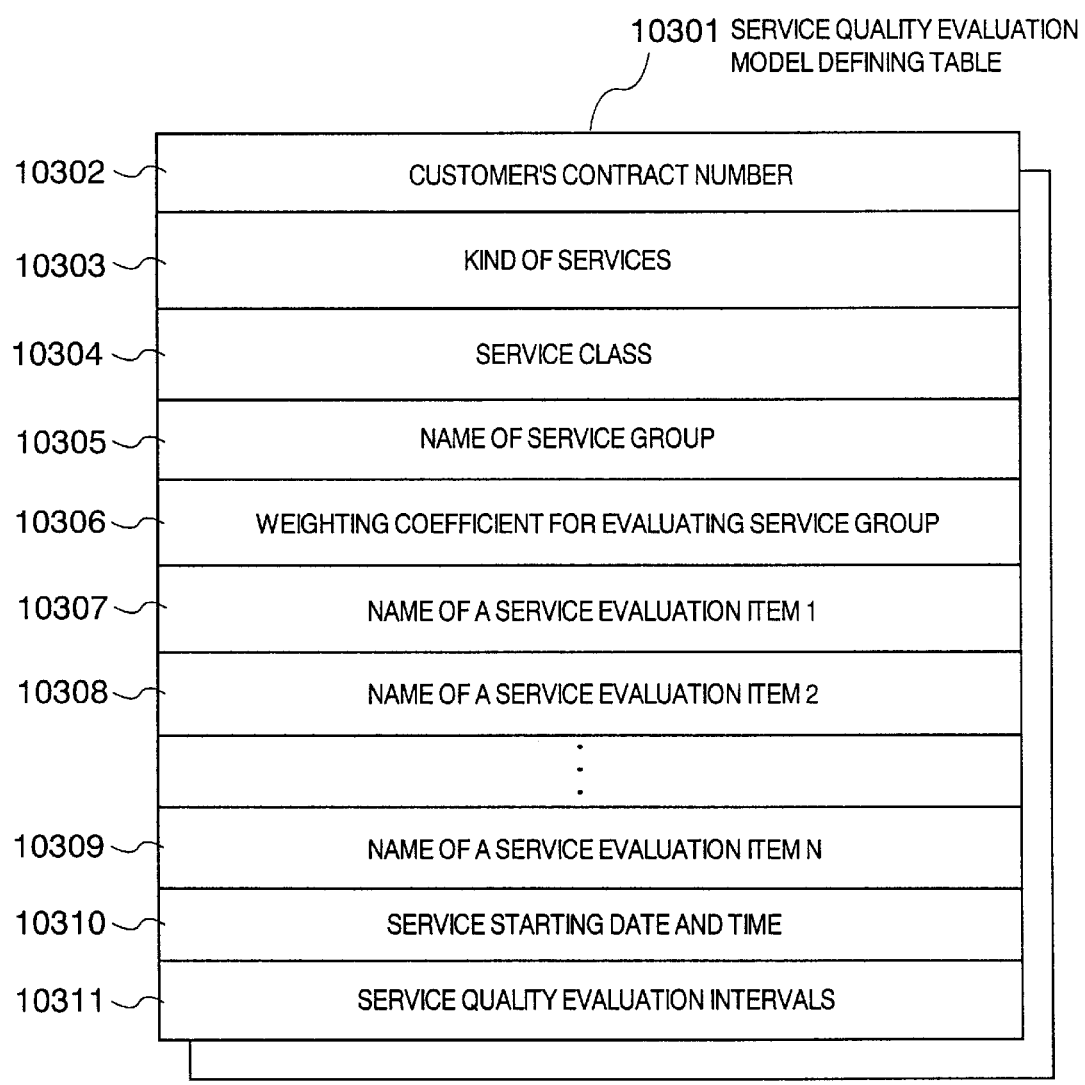
FIG. 14 illustrates a service quality evaluation model defining table according to the present invention.

In each of the service evaluation items, three grades of evaluation levels are set. Concerning the speech delay in this embodiment, a level 1 means a range (10225a) of 0–150 ms, a level 2 a range (10225b) of 150–400 ms and a level 3 a range (10225c) of not lower than 400 ms. The degrading coefficient 10226 is inputted as 0.5 (10226a) when the level changes from the level 1 to the level 2, and as 0.1 (10226b) when the level changes from the level 1 to the level 3. Inputting the degrading coefficient of 0.5 when the level changes from the level 1 to the level 2 means to a user who wants to receive the service of the level 1 that the value of the service which the user practically receives decreases 0.5 times in the level 2. The above-mentioned inputted information is stored on a service quality evaluation model defining table 10301 shown in FIG. 14 and a service evaluation item table 10321 shown in FIG. 15.

The service quality evaluation model defining table 10301 is formed of a customer's contract number 10302, the kind of services 10303, a service class 10304, the name of service group (only when a service group is defined) 10305, a weighting coefficient (only when a service group is defined) for the evaluation of the service group 10306, names of service evaluation items 10307–10309, service supply starting date and time 10310, and service quality evaluation intervals 10311.

Concerning the customer's contract number 10302, the kind of services 10303, service class 10304, names of service evaluation items 10307–10309, service supply starting date and time 10310 and service quality evaluation intervals 10311, values inputted from the model input screen 10221 are stored. The name of a service group 10305 and weighting coefficient for the evaluation of service group 10306 will be described in a second embodiment.

Figure 15:
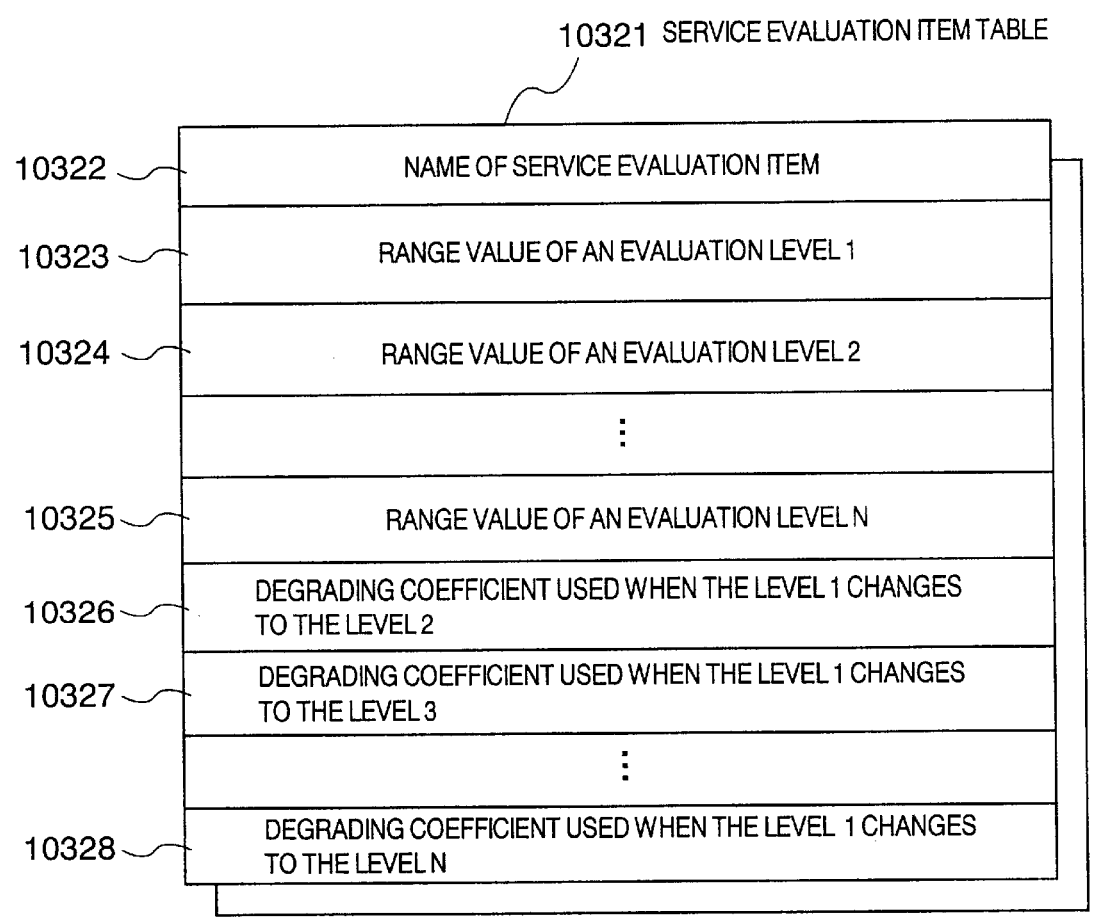
FIG. 15 illustrates a service evaluation item table according to the present invention.

A service evaluation item table 10321 of FIG. 15 holds information concerning the service evaluation items out of a service quality evaluation model. Namely, this table holds a range value (for example, "0–150 ms") (10323–10325) of an evaluation level and a degrading coefficient (for example, "0.5") (10326–10328) for a service level decrease from a level 1 to some other level with respect to the name (for example, "speech delay") of one service evaluation item.

Concerning the name of each service evaluation item, the name displayed on the model input screen 10221 is stored. Concerning the ranges (10225a–c, 10227a–c) of the evaluation level values and degrading coefficients (10226a and b, 10228a and b), what are inputted from the model input screen are stored under the corresponding items. Since one record is formed under one service evaluation item, two records are formed in the example of FIG. 11.

Figure 19:
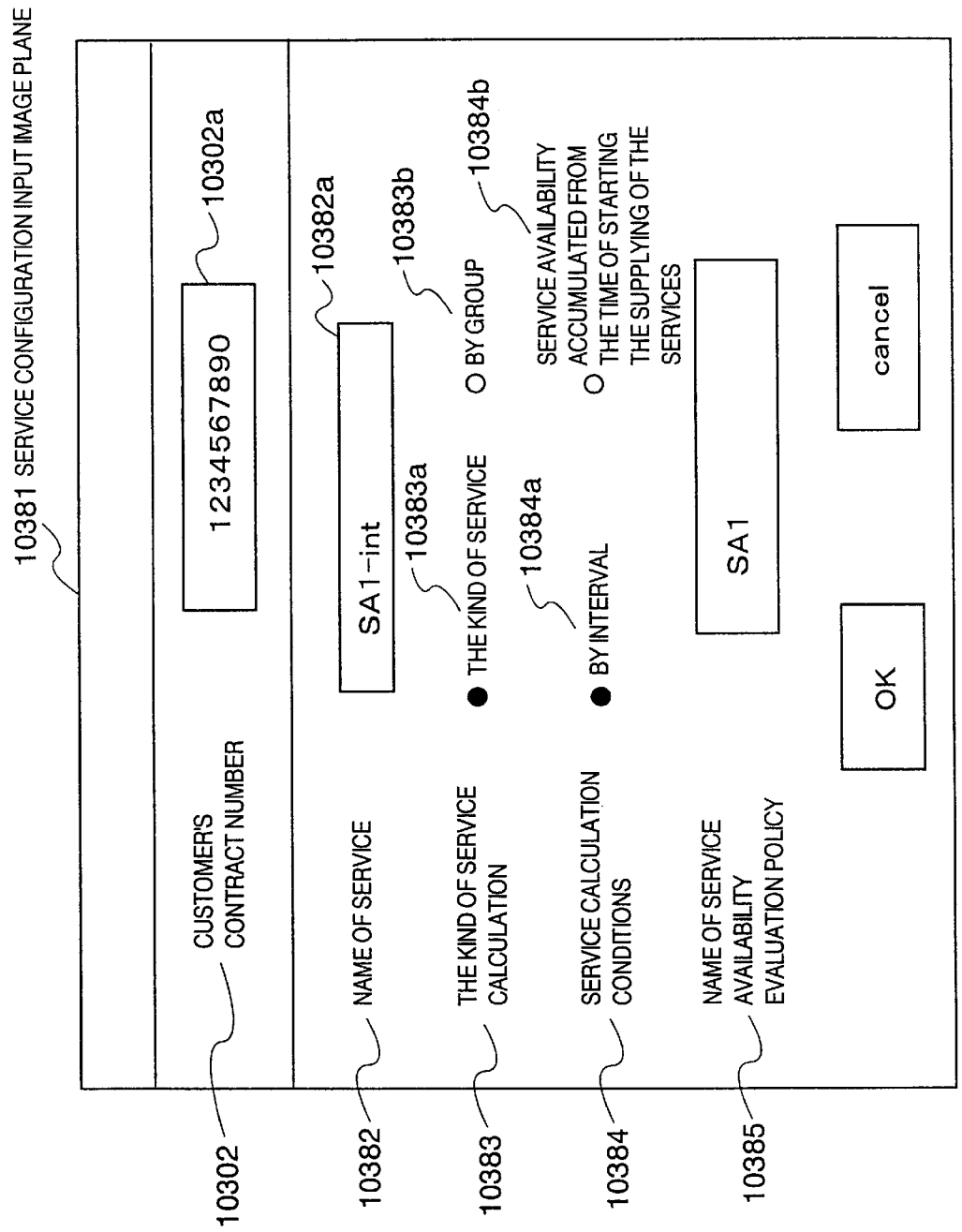
FIG. 19 illustrates a service configuration inputting screen according to the present invention.

A service configuration input screen 10381 shown in FIG. 19 displays thereon input field of a customer's contract number 10302, a name of service 10382, a kind of service calculation 10383, service calculation conditions 10384 and the name 10385 of a SA evaluation policy respectively. The kind of service calculation 10383 indicates a unit for the calculation of service availability. On this screen, either the kind of service or a unit group (which can be selected only when a service group is set) can be selected (10383a, 10383b). The service calculation conditions 10384 indicate the range of data to which the calculation of the service availability is directed. On this screen, either one of the quality evaluation interval unit and an accumulated total from the service supply starting time can be selected (10384a, 10384b). The details of a method of utilizing the kind of service calculation and service calculation condition will be described later.

A user inputs signals into this screen concerning all services the supply of which the user receives. The service configuration inputted during this time is stored by the name of services on the service configuration table 10331.

The service configuration table 10331 shown in FIG. 16 has the customer's contract number 10302, the name of service 1 103382, the kind 10333 of service 1 calculation, service 1 calculation condition 10334, and the name 10335 of SA evaluation policy 1. When there are plural services on the same customer's contract number, they are stored (10336–10343) continuously by the same format.

The SA evaluation policy is an evaluation standard for the service availability calculated by the procedure which will be described later. The SA evaluation policy is inputted by a user into the service availability evaluation policy input screen (which will hereinafter be referred to simply as "evaluation policy input screen") 10241 shown in FIG. 13.

The service availability represents an index indicative of the degree of a user's satisfaction concerning the service quality, which is expressed by a numerical value between 0 and 1. When the numerical value comes closer to 1, the service quality becomes higher, which indicates that the degree of the user's satisfaction is high. When the numerical value comes closer to 0, the service quality becomes lower, which indicates that the degree of the user's satisfaction is low.

The evaluation policy input screen 10241 is provided with a display field for the customer's contract number 10222, degree of satisfaction restoring measures 10242 and names (10243–10245) of services, and an input field for measures execution threshold values (10243–10245) by the kind of services.

The degree of satisfaction restoring measures 10242 are measures to be taken by a provider so as to restore the degree of a user's satisfaction when the service availability decreases with the degree of the user's satisfaction at a low level. The measures include, for example, the issuance of trouble tickets and the compensation of service charge. The service names (10243–10245) are displayed with reference to those (10332, 10336, 10340) on the service configuration table 10331. The measures execution threshold values (10243–10245) represent threshold values set so as to take the degree of satisfaction restoring measures when the service availability decreases to a level lower than the threshold values. Namely, the above-mentioned measures are taken when the service availability becomes lower than the measures execution threshold values.

In an example of FIG. 13, "demand for the issuance of trouble tickets" (measures execution threshold value: 0.95) 10243*a* and "customer's demand that the service charge be compensated" (measures execution threshold value: 0.75) 10243*c* are inputted as the degree of satisfaction restoring measures 10242 with respect to the name "SA1-int" 10243 of service. The measures of "performance report to a customer" are not executed since a measures execution threshold value therefor is not yet set (N/A) 10243*b*.

The SA evaluation policy inputted in this example is held in the service quality management model storage block 103, and stored in the SA evaluation policy table 10351 shown in FIG. 17.

The SA evaluation policy table 10351 has a name of evaluation policy 10352, a decision whether the degree of satisfaction restoring measures 1 should be applied or not 10353 (TRUE or FALSE), and a threshold value for the execution of the degree of satisfaction restoring measures 1 10354. When there are plural evaluation policies for the same customer's contract number, they are stored continuously by the same format (10355–10358). In the example of FIG. 13, "SA1-int" for the name of evaluation policy 10352, "TRUE" for the decision whether the degree of satisfaction restoring measures 1 should be applied or not 10353, "lower than 0.95" for the threshold value for executing the degree of satisfaction restoring measures 1 10354, "FALSE" for a decision whether the degree of satisfaction restoring measures 2 should be applied or not 10355, "N/A" for a threshold value for executing the degree of satisfaction restoring measures 2 10354, "TRUE" for a decision whether the degree of satisfaction restoring measures 3 should be applied or not, and "lower than 0.75" for a threshold value for executing the degree of satisfaction restoring measures 3 are stored in the form of one record.

In order to start supplying services by using this system of the above-described constitution, a user B and a provider A make a contract (service level agreement) with each other concerning the service quality. The contract may be made not only by writing or by word of mouth but also in a manner in which a terminal provided on a head office system of the user B is connected to the customers' service management system 302 of the provider A by utilizing an internet 316 as a communication line to thereby input data necessary for the contract by an on-line system.

The procedure for making such a contract will now be described, and the procedure for managing the services for customers by this system will thereafter be described.

Figure 5:
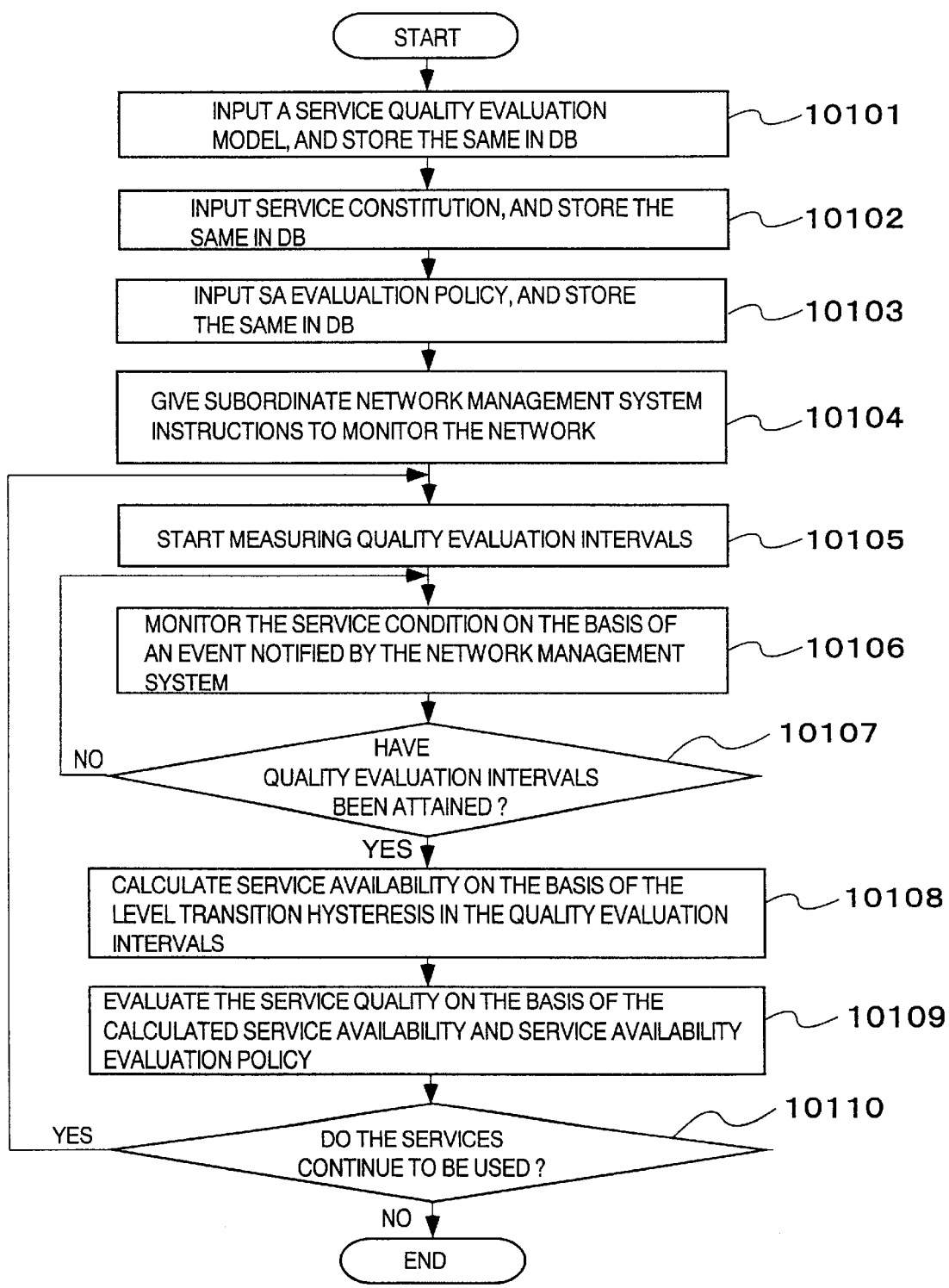
FIG. 5 is a general functional flow chart concerning a service quality management system according to the present invention.

FIG. 5 is a flow chart showing a flow of a process as a whole carried out in this system. Prior to the starting of supplying new services, the user inputs a service quality evaluation model by using the model input screen 10221 given by the service quality management model defining block 102. The contents of what are thus inputted are stored (10101) in the service quality evaluation model defining table 10301 held in the service quality management model storage block 103.

Figure 6:
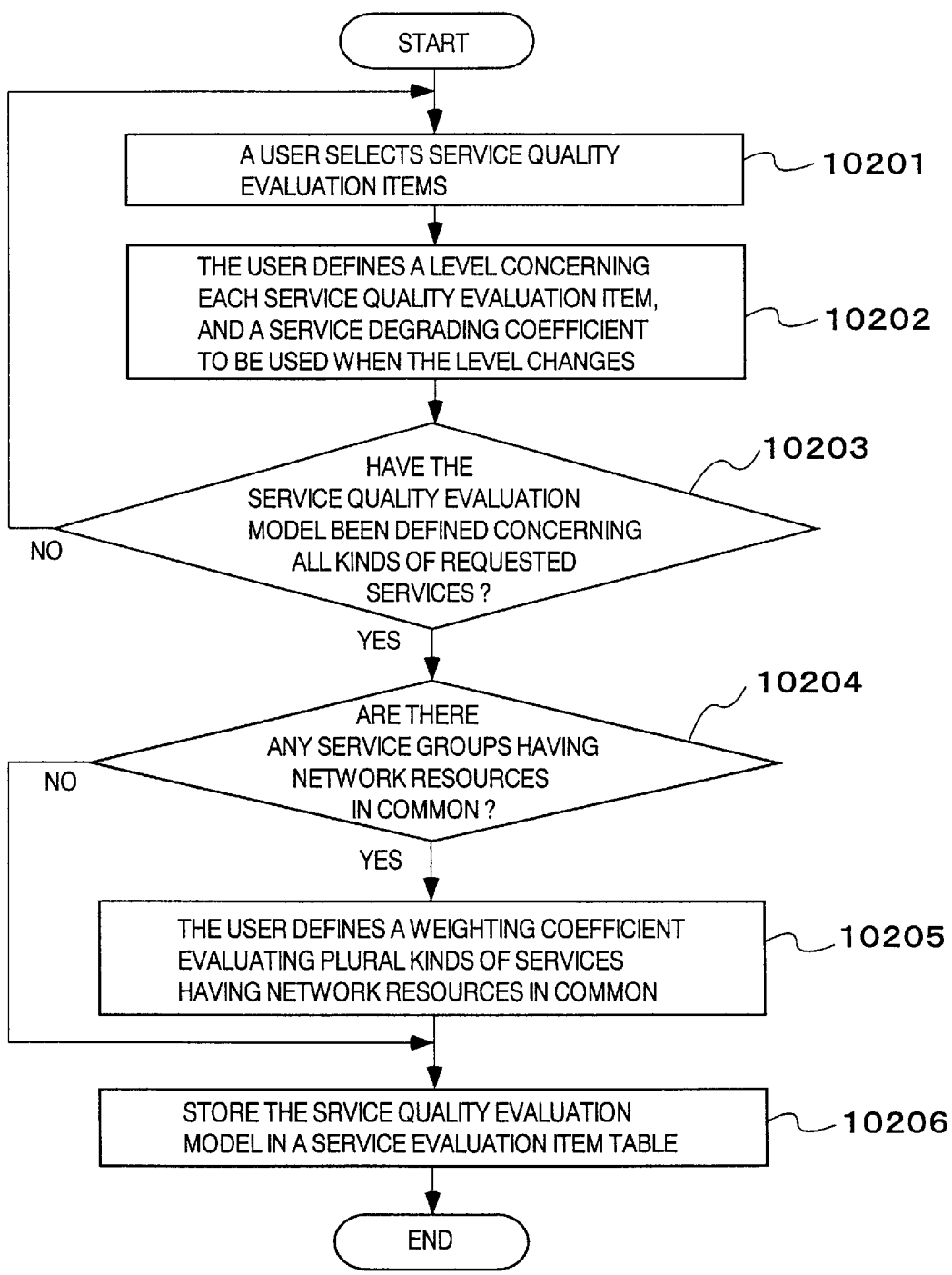
FIG. 6 is a flow chart of a service quality evaluation model inputting operation according to the present invention.

The detailed procedure for inputting the service quality evaluation model will be described with reference to FIGS. 6 and 11.

First, the user selects (10201) the service evaluation items. In this example, the speech delay 10225 and usable number of calling channels 10227 are selected. The level classification by the ranges of measurement values is carried out with respect to each of the selected service evaluation items, and the results are inputted as evaluation levels into 10225*a*–10225*c*. In this example, the levels 1–3 (10225*c*, 10225*b*, 10225*a*) of speech delay are inputted as "0–150 ms", "150–400 ms", "not lower than 400 ms" respectively. This means that the user expressed the user's desire to receive the supply of services of the level 1, which is determined as a standard evaluation level.

The degrading coefficients used when the standard evaluation level changes are then determined and inputted (10202). In this example, a degrading coefficient 10226*a* used when the standard evaluation coefficient changes to the level 2, and a degrading coefficient 10226*b* used when the standard evaluation level changes to the level 3 are inputted as 0.5 and 0.1 respectively.

The steps (10201–10202) are repeatedly carried out (10203) with respect to all of the services the supplying of which were requested, until this model has been defined.

When there are service groups having common network resources (10204), the user defines (10205) a weighting coefficient for evaluating plural services having the network resources in common. Since there are no service groups in this example, this step is not carried out. The inputted service quality evaluation model is stored on the service quality evaluation model defining table 10301 and service evaluation item table 10321 which are held in the service quality management model storage block 103, to finish (10206) the service quality evaluation model inputting process.

When the service quality evaluation model inputting process finishes, the service configuration inputting screen 10381 is displayed. The procedure for carrying out the service configuration inputting process (10102) will be described with reference to FIGS. 19 and 20. First, a name of service is inputted (10601) as a name of the service quality evaluation model inputted latest. In this example, the service model is named "SA-1int". The kind of service calculation and service calculation conditions are selected (10602, 10603). In this example, "the kind of service" and "interval unit" are selected respectively. Finally, a name of the SA evaluation policy is inputted (10604). The inputted service configuration is stored on the service configuration table 10331 held in the service quality management model storage block 103, to finish the service configuration inputting process.

Figure 7:
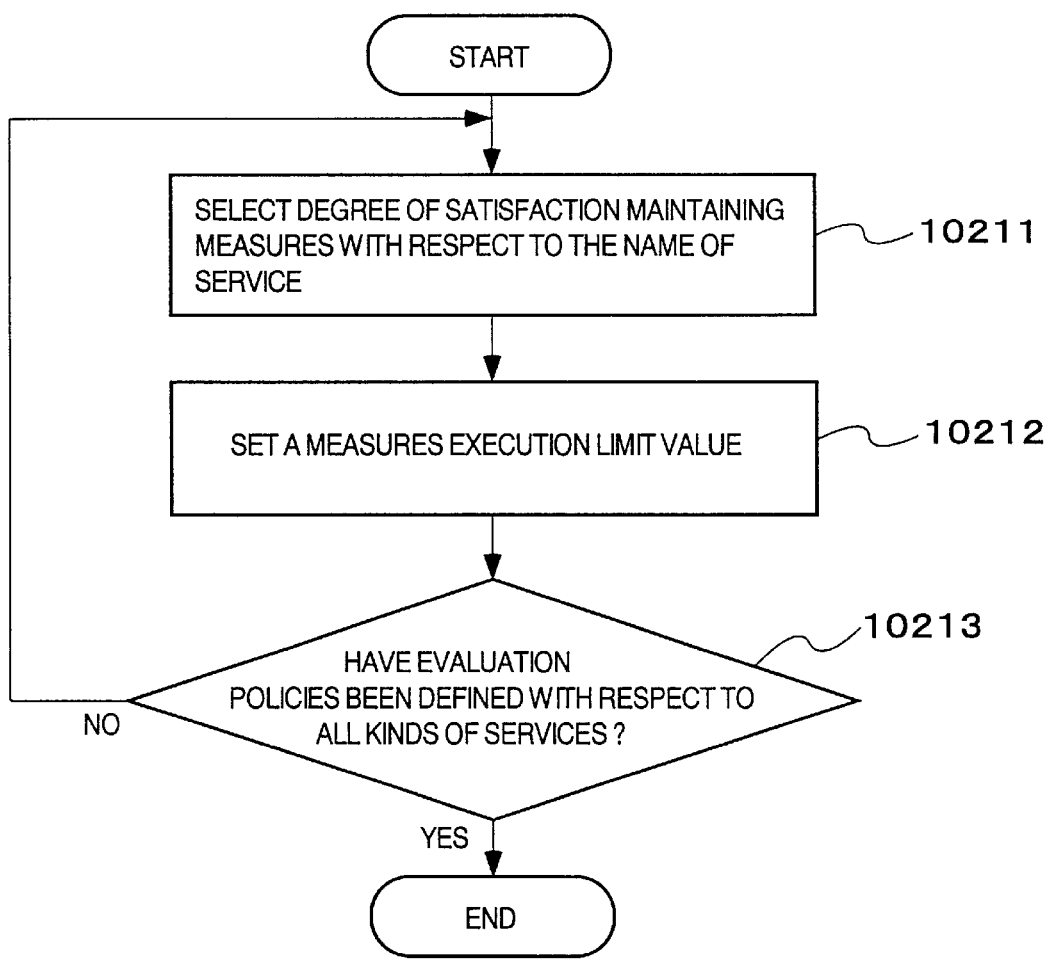
FIG. 7 is a flow chart of a service availability evaluation policy inputting operation according to the present invention.

When the inputting of the service configuration finishes, the SA evaluation policy inputting screen 10241 is displayed. The procedure for inputting (10103) the SA evaluation policy will be described with reference to FIGS. 7 and 13. The user selects the degree of satisfaction restoring measures 10242 (10211) with respect to the names 10243–10245 of services. In this example, a demand for the issuance of trouble tickets 10242a, a performance report to the user 10242b and a demand that the service charge be compensated for the user 10242C are selected and displayed. The threshold values for executing measures are inputted (10212) as conditions for executing the selected measures in 10243a–c, 10244a–c and 10245a–c. The SA evaluation policy is set for each service or service group defined in the service quality evaluation model. Therefore, the steps 10211–10212 are carried out repeatedly (10213) until the evaluation policies for all services have been set. The inputted SA evaluation policies are stored on the SA evaluation policy table 10351 held in the service quality management model storage block 103, to finish the SA evaluation policy inputting process.

The steps described up to now constitute the process carried out when a contract is made. The acceptance of the inputted conditions by the provider A means the arrival at the service level agreement. From this time on, the provider A has the duty to supply services to the user in accordance with the contents of the agreement. The procedure for managing the services supplied to the user in this system will now be described.

The service condition monitoring block 104 in the service management system 302 transmits service evaluation items and a range of measurement value evaluation levels to the network management module 106 in the network management system 303, and gives instructions to carry out a network monitoring operation (10104). The counting of the time is then done so as to determine the quality evaluation intervals, by using a time counter. After the time counter (not shown) is cleared, the counting of the time during which services are supplied starts being done (10105).

Figure 8:
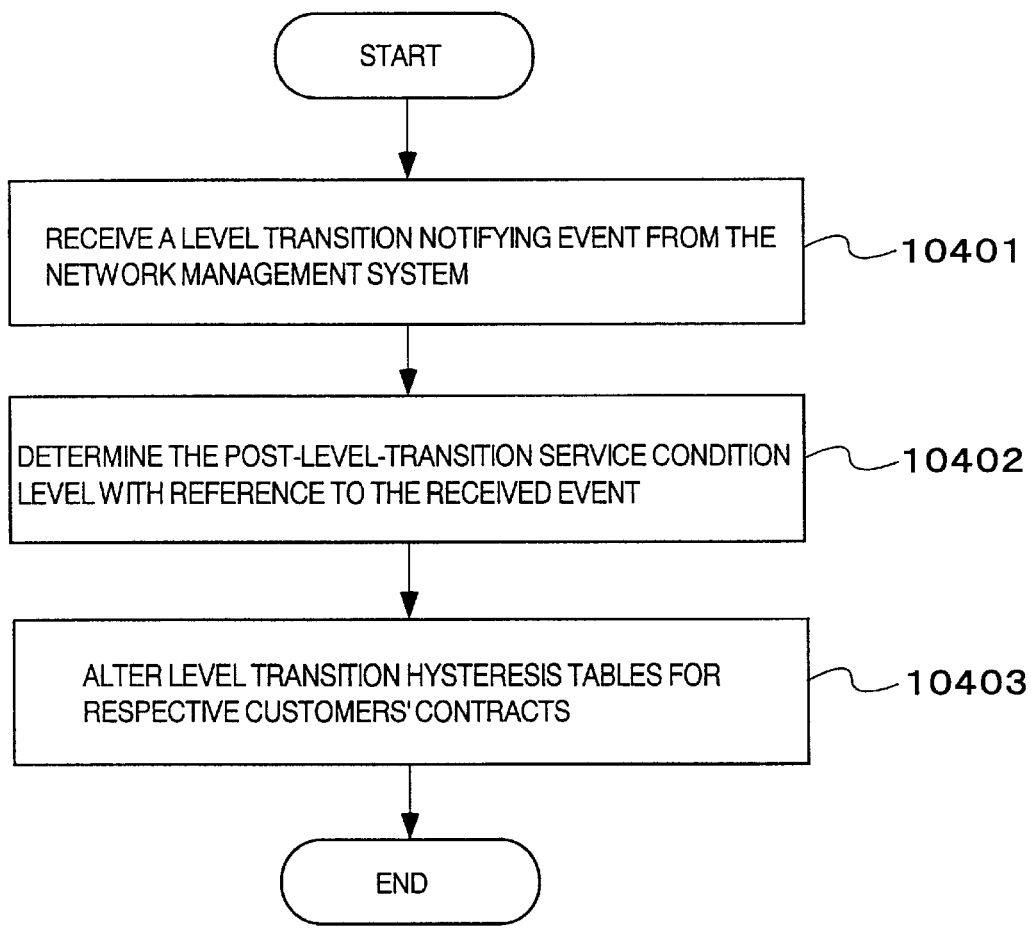
FIG. 8 is a flow chart of a service condition monitoring operation according to the present invention.

The network management module 106 starts monitoring the network in accordance with the service evaluation items and evaluation level received from the service condition monitoring block 104. The network management module 106 determines evaluation levels to which the measurement data concerning different service evaluation items belong respectively. Every time the transition of the level is detected, the transition of the level is issued as a notification of event. The events may be notified periodically at predetermined time intervals. An event notified includes service evaluation items, and, an evaluation level and a time stamp at the notification time. The service condition monitoring block 104 is adapted to monitor (10106) the condition of the network on the basis of an event notified by the network management module 106. The details of the procedure of this monitoring operation will be described with reference to FIG. 8.

Figure 18:
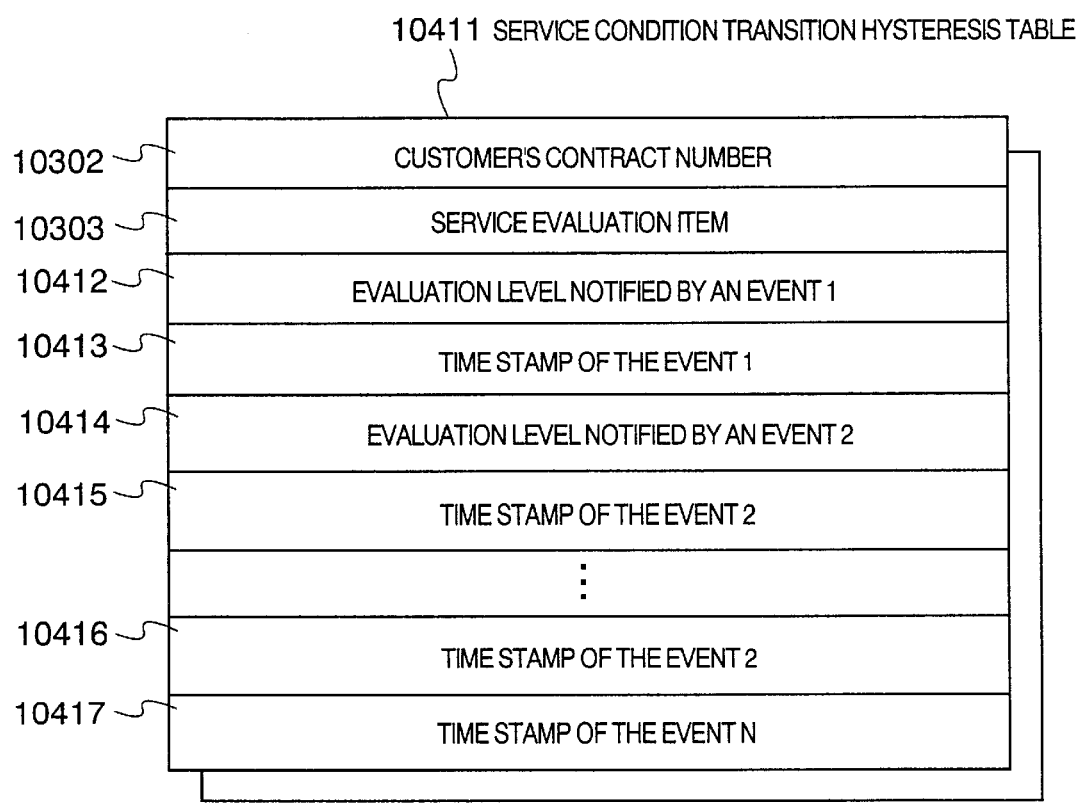
FIG. 18 illustrates a service condition transition history table according to the present invention.

The service condition monitoring block 104 receives (10401) a level transition notifying event from the network management module 106. An after-transition evaluation level is identified (10402) on the basis of the received event, and the event added (10403) to a level transition hysteresis table held in the service quality management model storage block 103. The level transition hysteresis table 10411 shown in FIG. 18 has a customer's contract number 10302, a service evaluation item 10303 (for example, "speech delay"), an evaluation level 10412 (for example, "level 2") notified by an event 1, and a time stamp 10413 of the event 1. Second and later hysteresis data with respect to the same customer's contract number are stored (10414–10417) continuously by the same format. The network monitoring operation continues to be carried out while services are supplied.

The service quality calculation and evaluation block 105 monitors (10107) the service supply time counted by the counter, as to whether or not the service supply time exceeds the time specified by the quality evaluation interval. When the service supply time exceeds the quality evaluation interval, the service availability is calculated (10108) for every service defined in the quality evaluation model, on the basis of the contents of what are held in the level transition hysteresis table 10411. The details of the procedure of the process will be described later.

The service quality calculation and evaluation block 105 evaluates the service quality (10109) on the basis of the calculated service availability and SA evaluation policy held on the SA evaluation policy table 10351. The details of the procedure of the process will be described.

The steps 10105–10109 of FIG. 5 are carried out repeatedly while the services continue to be supplied, and the measurement, calculation and evaluation of the service quality based on the service level agreement are thereby carried out (10110).

The detailed procedure for calculating the service availability will be described with reference to FIG. 9. First, whether the service availability per evaluation interval is calculated or the service availability accumulated from the service supply starting time is calculated with reference to service 1 calculation conditions 10334 on the service configuration table 10331, is determined (10501). A case where the calculations are made for every interval is now taken as an example, and a description of such a case will be given. The service quality calculation and evaluation block 105 takes out (10502) the contained data during the time corresponding to the quality evaluation interval actually measured, from the level transition hysteresis data 10411 held in the service condition monitoring block 104. A service quality evaluation model corresponding to the relative service is obtained with reference to the service quality evaluation model defining table 10301, and the service availability is calculated (10503). The service availability is determined by the following equation.

$$SA = \Sigma(\text{time during which a service level is held} \times \text{degrading coefficient}) \div \text{evaluation interval} \tag{1}$$

When there are plural service evaluation items, this equation is applied to all of the evaluation items, and a product of the calculated service availability is determined, the product being used as a value of the availability of the relative service. The service availability determining method is not limited to this method. The lowest value of service availability among the values of service availability concerning all service evaluation items may be used as a value of availability of the relative service, or a value of service availability may be determined by carrying out a weighting operation with respect to each service evaluation item.

The information is then retrieved (10511) from the SA evaluation policy table corresponding to the service, and the calculated value of the service availability and a measures execution threshold value are compared (10512) with each other concerning the quality evaluation item for which the degree of satisfaction restoring measures are set. When the value of the service availability is lower than the measures execution threshold value, the measures are executed (10513).

For example, when "the service availability calculated concerning SA1-int is lower than 0.95", instructions to demand that a trouble ticket be issued are given to the trouble management system 312. When "the service availability calculated concerning SA1-all is lower than 0.7", instructions to demand that the service charge be compensated for the customer are given to the billing system 313. Concerning all the values of calculated service availability, the steps 10511–10513 are carried out repeatedly (10514). The service quality calculation and evaluation block 105 may clarify the results of calculation of the service availability concerning a specific customer in accordance with a request made by an external management system.

According to the above-described service management system, the degree of satisfaction in conformity with the circumstances of each user concerning the service quality can be determined quantitatively by employing a single index, which is called service availability, on the basis of a service quality evaluation model determined by the user.

The provider can check by this system the quality of the system at any time during an operation thereof, and execute when the quality of the system lowers suitable measures at a suitable time so as to restore the degree of the user's satisfaction. This enables the provider to maintain the degree of the user's satisfaction at a level not lower than a predetermined level at all times, and the competitive power of the provider to be improved.

According to this system, the provider becomes able to set service charge proportional to the service quality. Namely, the provider can set the service charge high by promising that high-quality services will be supplied. Conversely, the service quality may be lowered by reducing the service charge. Employing such a service charge system has the following advantages. When a user sets the measures execution threshold value to a level near zero, the service quality lowers but the user can receive the supply of services at a correspondingly low price. On the other hand, when the user sets the measures execution threshold value to a level near one, the user can always receive high-quality services, and, even when the service quality should lower, compensation is given correspondingly. However, the service charge becomes correspondingly high.

A second embodiment of the present invention will now be described.

Figure 4:
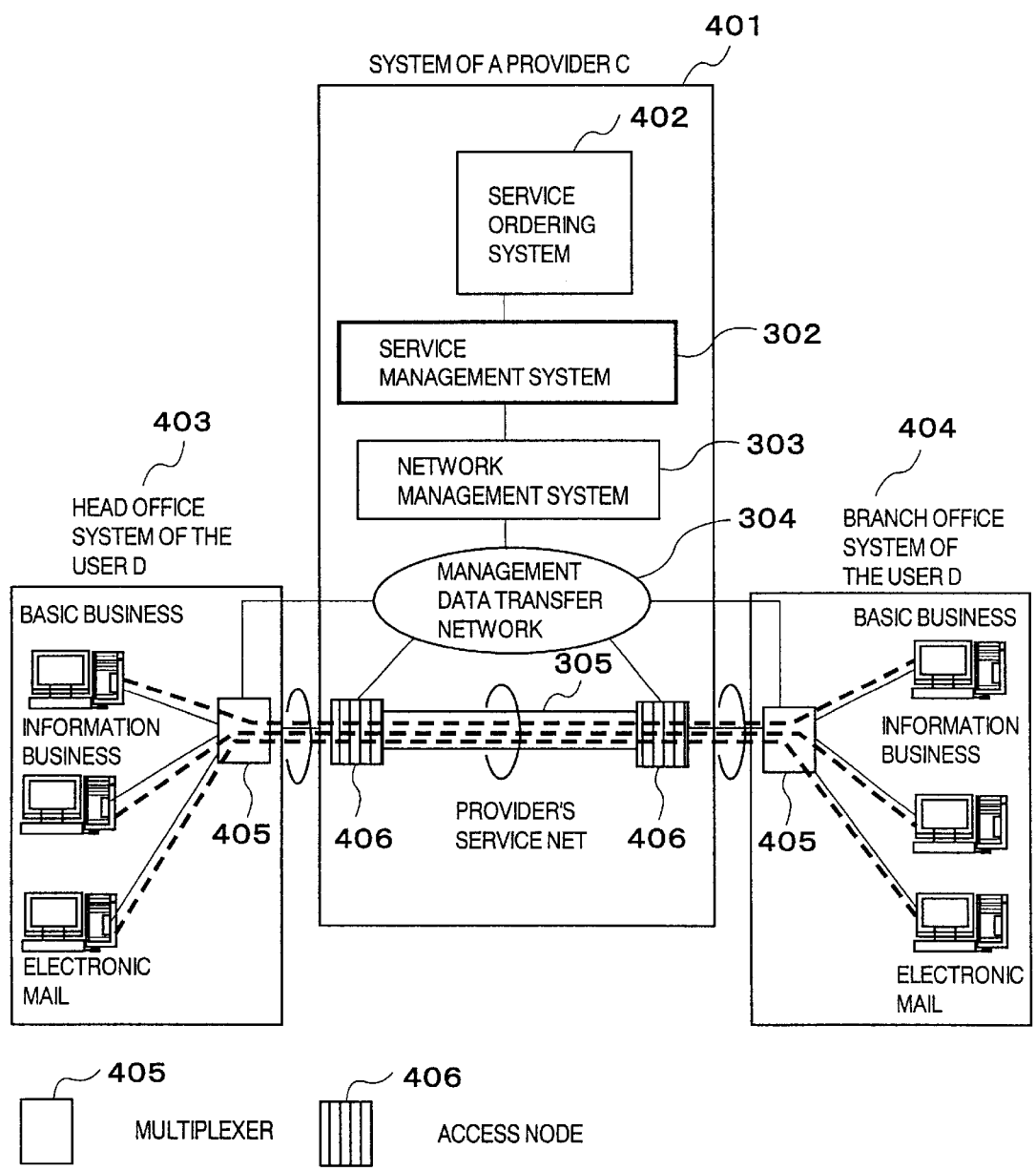
FIG. 4 illustrates the construction of a system of a service provider who supplies private line services having plural service classes and that of a system of a user in a second embodiment of the present invention.

FIG. 4 shows the construction of a system of a provider C supplying private line services having plural service classes, and that of a system of a user D utilizing the services among plural positions thereof.

A system 401 of the provider C is formed of a provider's service network 305 adapted to supply private line services, a management data transfer network 304 adapted to give and take management information by using a protocol, such as a SNMP between itself and a network unit, a network management system 303 adapted to monitor and control the condition of the network, a service management system 302 adapted to monitor the condition of the services received by the user, in cooperation with the network management system 303, and a service ordering system 402 adapted to manage the reception of orders for private line services. The system of the user D is formed of a head office system 403 and a branch office system 404. An access node 406 provided in a provider's service network 305 and a multiplexer 405 provided on the systems 403, 404 are respectively connected together. The user D can therefore utilize services simultaneously by using various types of business terminals network-connected to the multiplexer 405.

In the same manner as in the first embodiment, the user makes a service level agreement with the service provider, i.e., defines a service quality evaluation model (group) and a SA evaluation policy. This operation is carried out by utilizing the service quality evaluation model (group) input screen 10551 shown, for example, in FIG. 12, which displays input fields for a customer's contract number 10222, a name 10232 of a service group, the kinds 10552, 10557, 10560 of services, weighting coefficients 10553, 10558, 10562 for these services, service classes 10554, 10559, 10563, service evaluation items of a usable band width 10555, a transfer delay 10560 and an abandonment rate 10564 of cell, and degrading coefficients 10556, 10560, 10565 thereof. The user inputs information in all of these input fields. The weighting coefficients 10553, 10558, 10562 represent a relative order of precedence when there are plural kinds of services in the service group, and set so that the sum of all of the weighting coefficients becomes one.

In this embodiment, plural applications (EDI service, TV meeting service and e-mail) can be utilized at once on a common access line, and these services shall form one service group. When the user sets the weighting coefficients 10553, 10558, 10562 in accordance with the degree of importance of the applications in such a case, the service quality of the service group as a whole can be evaluated.

Figure 9:
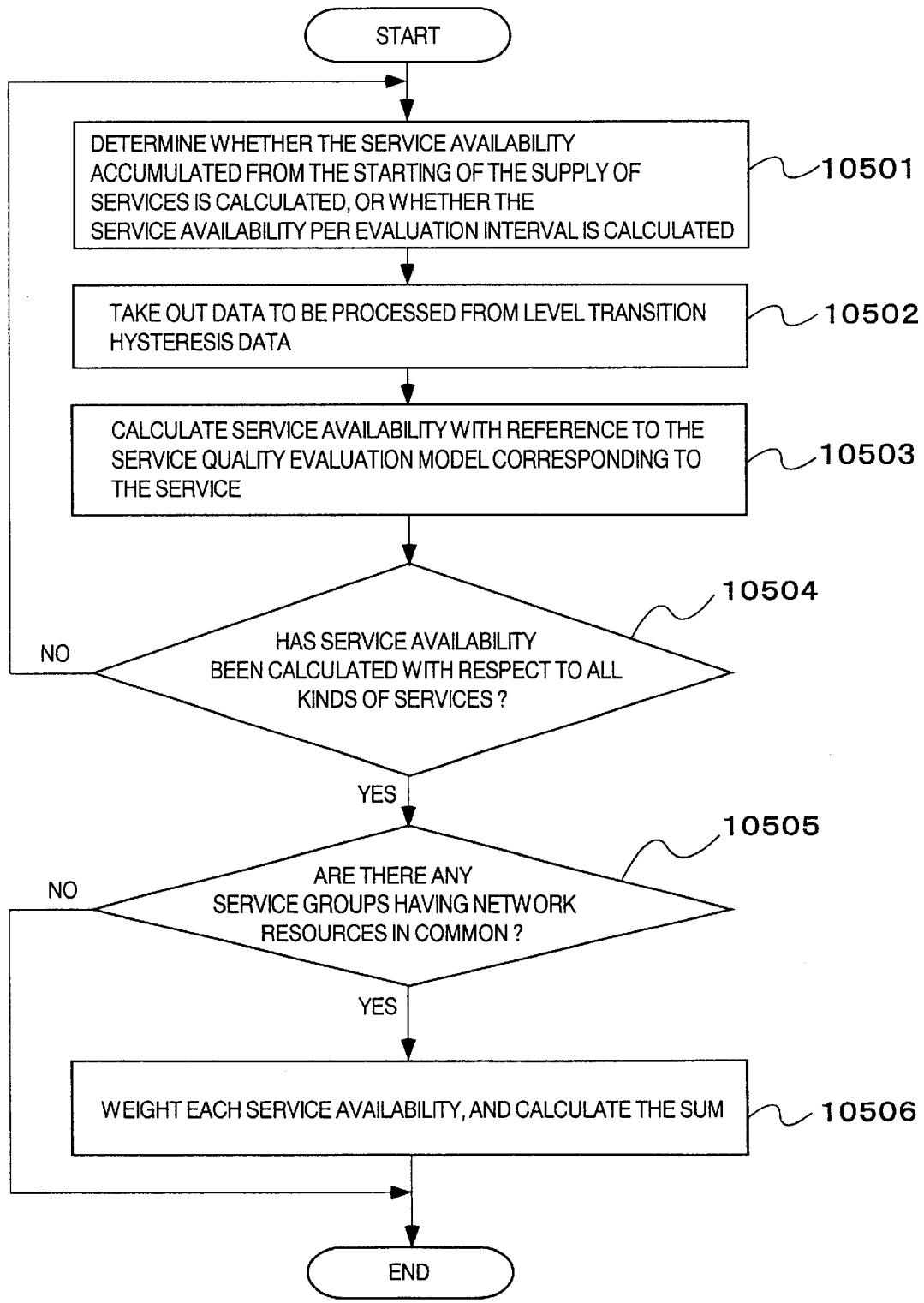
FIG. 9 is a flow chart of a service availability calculation operation in the present invention.
Figure 10:
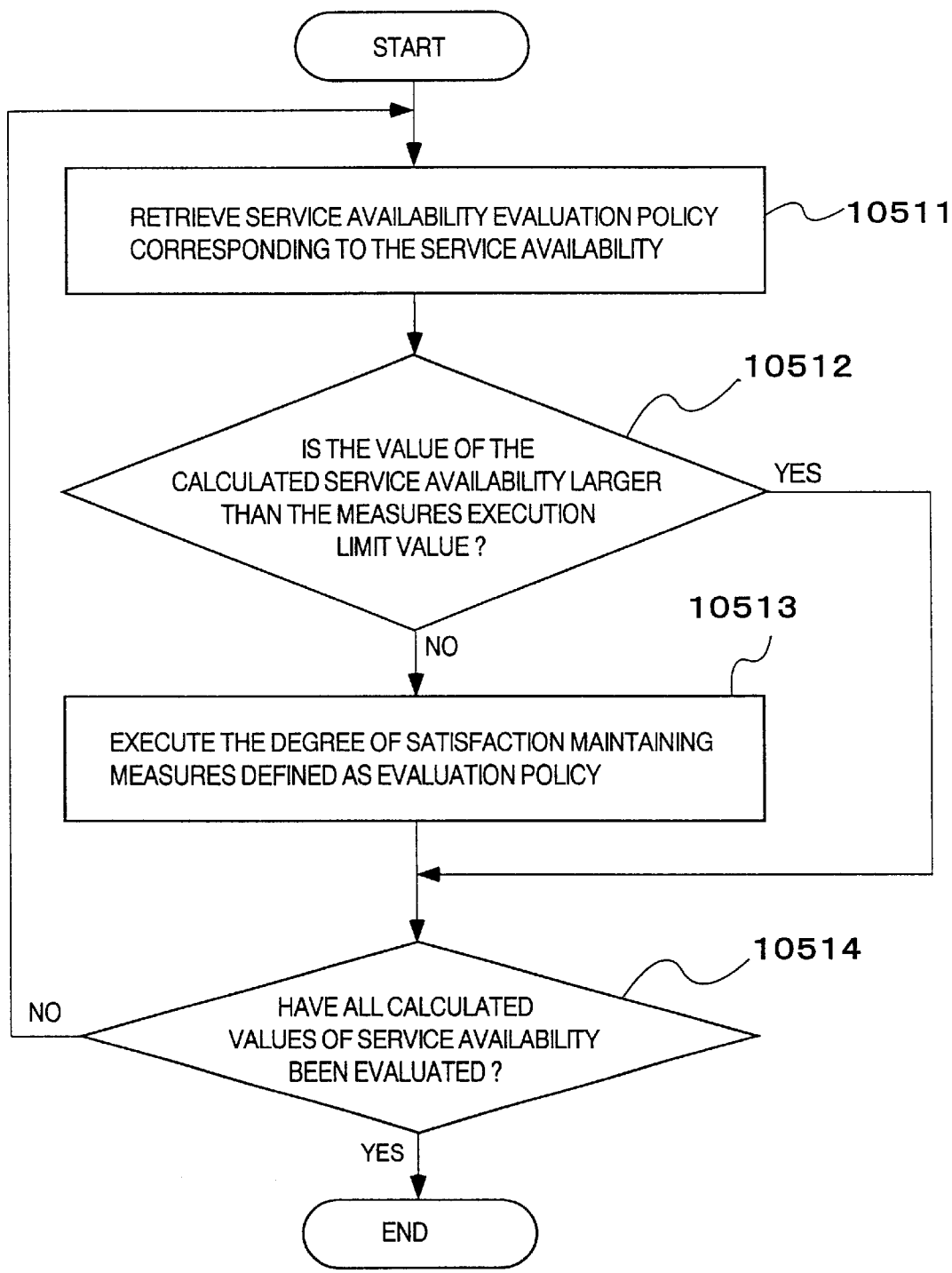
FIG. 10 is a flow chart of a service availability evaluation operation according to the present invention.

When a service group having net work resources in common is defined (10505) in the service availability calculation flow shown in FIG. 9, the service availability of the group as a whole is determined (10506) in accordance with the following equation.

$$SA = \Sigma(SA \text{ calculated for every kind of service} \times \text{weighting coefficient}) \quad (SA: \text{Service Availability}) \qquad (2)$$

Owing to the service availability thus calculated, the user can determine, for example, what point in time the service contract number should be increased or decreased, by comparing the service availability of each single kind of service with each other, or with reference to the service availability of a group on which more important business requirement, i.e. more important kind of service for the above-mentioned business is reflected.

When the provider anticipates that a service quality-deteriorated condition will continue for a certain period of time, by utilizing the results of the summarization of service availability of the same kind of services, the service management system 302 can demand a temporary inhibition of the reception of orders for the same services from the service ordering system 402.

Owing to the present invention described above, a service management system for obtaining a single index representing the degree of user's satisfaction in which the user's individual circumstances are taken into consideration, and determining the user's satisfaction on the basis of the index can be attained.

Also, a service management system giving other existing system instructions to execute suitable measures corresponding to the degree of the user's satisfaction can be attained.

What is claimed is:

1. A service management server which manages a service network to which plural user's terminals are connected comprising:

a service quality evaluation standard receiving means for receiving an input of items for evaluating the quality of services supplied by utilizing said service network, and an input of evaluation standard for the information representative of the degree of the condition of services under the evaluation items, service condition information obtaining means for obtaining information, which is representative of the degree of the service condition concerning the evaluation items, while services are being supplied through said service network, and satisfaction degree-representing index calculating means for evaluating the information, which is obtained by said service condition information obtaining means, and which represents the degree of the service condition, in accordance with the evaluation standard an input of which is received by said service quality evaluation standard receiving means, and calculating a satisfaction degree-representing index indicating the degree of a user's satisfaction concerning the service quality;

satisfaction degree-representing index evaluation standard receiving means for receiving an input of a range of satisfaction degree-representing indexes which the user can permit, and an input of measures to be executed when the satisfaction degree-representing index calculated by said satisfaction degree-representing index calculating means is out of said permissible range, means for comparing with each other the satisfaction degree-representing index calculated by said satisfaction degree-representing index calculating means and said permissible range of satisfaction degree-representing index received by said satisfaction degree-representing index evaluation standard receiving means, and means for giving instructions to execute the measures to be carried out practically which are received by said satisfaction degree-representing index evaluation standard receiving means, in a case where the results of the comparison made by said comparing means show that the satisfaction degree-representing index calculated by said satisfaction degree-representing index calculating means is out of the permissible range.

2. A service management server according to claim 1, wherein:

said information obtained by said service condition information obtaining means and representing said degree of the service condition concerning the evaluation items has a range of values which can be taken by the measurement values for the evaluation items, the range of values including evaluation levels divided into plural sections, said evaluation levels having at least either one of an upper threshold value and a lower threshold value of each section, said evaluation standard received by said service quality evaluation standard receiving means including a degrading coefficient, which represents the degree of a decrease in the service quality, with respect to an evaluation level other than a standard evaluation level to which the service, the supply of which is received by the user, belongs.

3. A service management server according to claim 1, wherein:

said service quality evaluation standard receiving means further receives an input of a connecting coefficient for setting not smaller than two kinds of services as one service group, and an input of a weighting coefficient which is in accordance with the degree of importance of each kind of service belonging to the service group, said satisfaction degree-representing index calculating means calculating each satisfaction degree-representing index concerning not smaller than two kinds of services belonging to the service group, carrying out a weighting operation on the basis of the weighting coefficient, and calculating a satisfaction degree-representing index of the services as the service group.

4. A service management server according to claim 2, wherein:

service supply time by evaluation level calculating means for calculating the time during which services are supplied at each evaluation level on the basis of the evaluation levels obtained by said service condition obtaining means is further provided, said satisfaction degree-representing index calculating means calculate a satisfaction degree-representing index by dividing a product of the service supply time by evaluation level calculated by said service supply time evaluation level calculating means and degrading coefficients for the respective corresponding evaluation levels by the sum of the time during which the services are supplied at each of the evaluation levels.

5. A service managing method for managing a service network to which plural user's terminals are connected, comprising:

a service quality evaluation standard receiving step for receiving an input of items for evaluating the quality of services supplied by utilizing said service network, and an input of evaluation standard for the information representative of the degree of the condition of services under the evaluation items, a service condition information obtaining step for obtaining information, which is representative of the degree of the service condition concerning the evaluation items, while services are being supplied through said service network, and a satisfaction degree-representing index calculating step for evaluating the information, which is obtained by said service condition information obtaining step, and which represents the degree of the service condition, in accordance with the evaluation standard an input of which is received by said service quality evaluation standard receiving step, and calculating a satisfaction degree-representing index indicating the degree of a user's satisfaction concerning the service quality;

a satisfaction degree-representing index evaluation standard receiving step for receiving input of a range of satisfaction degree-representing indexes which the user can permit, and an input of measures to be executed when the satisfaction degree-representing index calculated by said satisfaction degree-representing index calculating step is out of said range, a comparing step for comparing with each other the satisfaction degree-representing index calculated by said satisfaction degree-representing index calculating step and said permissible range of satisfaction degree-representing index received by said satisfaction degree-representing index evaluation standard receiving step, and an instructing step for giving instructions to execute the measures to be carried out practically which are received by said satisfaction degree-representing index evaluation standard receiving means, in a case where the results of the comparison made by said comparing steps show that the satisfaction degree-representing index calculated by said satisfaction degree-representing index calculating step is out of the permissible range.

6. An information recording medium storing a computer program therein for causing a computer to function as a service managing server for managing a service network to which plural user's terminals are connected, the program causing the computer to perform:

a service quality evaluation standard receiving process receiving an input of items for evaluating the quality of services supplied by utilizing said service network, and an input of evaluation standard for the information representative of the degree of the condition of services under the evaluation items;

a service condition information obtaining process obtaining information, which is representative of the degree of the service condition concerning the evaluation items, while services are being supplied through said service network;

a satisfaction degree-representing index calculating process evaluating the information, which is obtained by said service condition information obtaining means, and which represents the degree of the service condition, in accordance with the evaluation standard an input of which is received by said service quality evaluation standard receiving means, and calculating a satisfaction degree-representing index indicating the degree of a user's satisfaction concerning the service quality;

a satisfaction degree-representing index evaluation standard receiving process receiving an input of a range of satisfaction degree-representing indexes which the user can permit, and an input of measures to be executed when the satisfaction degree-representing index calculated by said satisfaction degree-representing index calculating means is out of said range;

a comparing process comparing with each other the satisfaction degree-representing index calculated by said satisfaction degree-representing index calculating means and said permissible range of satisfaction degree-representing index received by said satisfaction degree-representing index evaluation standard receiving means; and a instructing process giving instructions to execute the measures to be carried out practically which are received by said satisfaction degree-representing index evaluation standard receiving means, in a case where the results of the comparison made by said comparing means show that the satisfaction degree-representing index calculated by said satisfaction degree-representing index calculating means is out of the permissible range.

* * * * *